March 25, 1969 H. D. VAN SCIVER 3,434,938
METHOD AND APPARATUS FOR PRODUCING METAL SCREEN SHEET
Filed Dec. 29, 1965
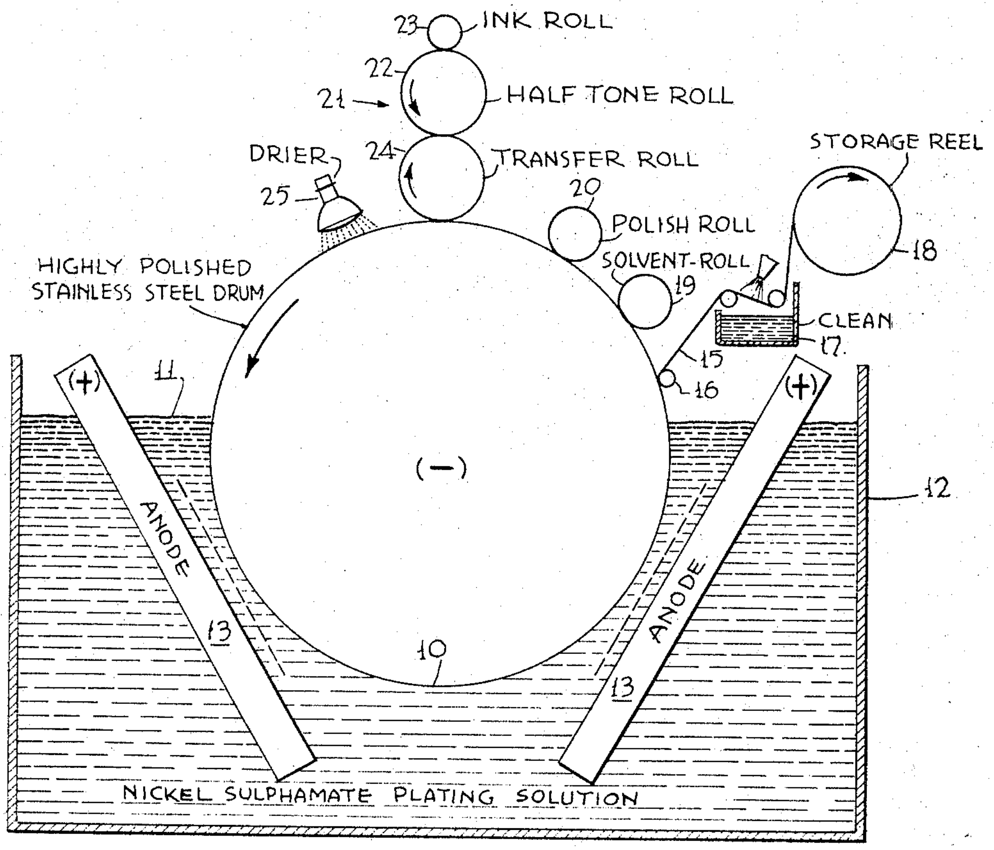
INVENTOR.
Herbert D. Van Sciver
BY
Thomas J. Dag...
ATTORNEY United States Patent Office 3,434,938

Patented Mar. 25, 1969

3,434,938

METHOD AND APPARATUS FOR PRODUCING METAL SCREEN SHEET

Herbert D. Van Sciver, Merion, Pa., assignor to The Budd Company, Philadelphia, Pa., a corporation of Pennsylvania Filed Dec. 29, 1965, Ser. No. 517,306
Int. Cl. C23b 7/08
U.S. Cl. 204—11 7 Claims

ABSTRACT OF THE DISCLOSURE

Methods and apparatus for making a metal screen sheet include the use of a rotary drum. Patterns are formed on the drum. Metal is electrodeposited on the drum as the drum is rotated. The formed sheet having perforations corresponding to the patterns is then peeled from the drum.

This invention relates to method and apparatus for producing metal screen sheet, particularly a nickel screen sheet with very small, accurately formed and precisely located holes, and has for an object the provision of improvements in this art.

There is a considerable demand in chemical and electrochemical processes for nickel screen sheet which may be used in, for example, nickel-cadmium batteries. To be satisfactory, the holes in the sheet need to be very accurately sized and precisely located and the sheet needs to be very uniform in thickness throughout its extent. Often the holes are extremely small and close together.

Heretofore such screen sheet has been made by printing a pattern upon a previously produced sheet and etching through the sheet by known materials and methods to form the holes. This etching method is quite expensive and may involve the prior production of a non-porous sheet of closely controlled thickness by an electrolytic plating process. Obviously, if there are any holes in the starting sheet they will be enlarged in the etching process and if there are any such enlarged holes they will make the screen sheet useless.

According to the present invention the sheet forming and hole forming steps are combined in a single electroplating process whereby to achieve great economy of production and to provide control of desired sheet thickness, hole size, and hole spacing in a simple and efficient manner.

The objects, as well as various novel features and advantages, will be apparent from the following description of an exemplary embodiment, reference being made to the accompanying drawings, wherein:

The single figure is a diagrammatic vertical section of apparatus embodying and for effecting the invention.

According to this invention, insulating dots are printed on the highly finished and polished surface of a rotary drum, as by known offset printing means and materials; then the porous screen sheet is electro-deposited; the screen sheet is stripped off the drum, taking with it such dots of material as may be retained; the adherent particles are removed by known solvent and cleaning means from the screen sheet; the residual dots are removed from the drum by known solvent and cleaning means; the drum is further cleaned and polished; and a new pattern of dots is again printed on the drum; and the process repeated.

The printed dots, although thin, will be of sufficient height on the drum to accommodate the thickness of the porous sheet which is to be formed, that usually being extremely thin; and by varying the viscosity of the material deposited to form the dots, the thickness of the dots can be varied within all the ranges of thickness of screen sheet to be produced, as may be desired.

Referring to the drawing, a cathode drum 10 rotates in the direction of the arrow thereon in an electrolytic solution bath 11 in a tank 12 having therein suitable anodes 13.

The drum has a highly finished and polished plating surface. It may, for example, be formed of stainless steel and may be plated, as by chrome or the like, if desired. For nickel screen sheets the electrolytic solution may be of a known type, as for example, a nickel sulfamate plating solution. The anodes in this case will be a depolarized form of nickel. They are shown in a simple illustrative form but, as a refinement, they could be made to closely conform to the drum shape, and the like. Nickel electrodeposition apparatus and methods per se are very well known and need no more detailed description here, it being only necessary to mention that extreme care is taken in both apparatus and procedure to insure the formation of a sheet which is perfect and free from undesired holes.

The screen sheet 15 (often referred to as a "film" in the very thin form produced) is peeled off the preprinted dot-coated drum, as at a peeling roll 16; cleaned with solvent and water, or both as may be needed, at a cleaning unit 17; dried; and wound into a roll, as at a reel 18.

Between the point where the screen sheet is removed from the drum and the point where the pattern is to be printed, the residual adherent ink or paint of the insulating dots is removed, as by a solvent applying and cleaning roll 19. The solvent will be selected to remove the coating ink or paint used; and means of known form will be provided for cleaning the roll 19 and keeping cleaning solution out of the bath.

The cleaned roll is further cleaned and given a high polish, as by a polishing roll 20.

The numeral 21 designates the dot printing unit in general. This apparatus is of a known type comprising a halftone engraved roll 22 bearing a pattern of dots of the size and distribution desired to hold suitable spots of ink or paint of the desired type, an inking roll 23, and a transfer roll 24 for depositing the ink spots on the surface of the drum 10.

Between the printing unit 21 and the bath there is a drying zone where the coating is dried by air or other suitable agent, which may include heating lamps 25, so that the dots will hold their shape and position and resist marring in the plating solution. That is, they are dried and hardened until they lose their character for flow and coating objects before they enter the bath, this being entirely different from the printing art where the coating material while still soft is transferred from the printing roll to a previously formed coating-adherent sheet.

The coating material will be of such a nature that it will not be harmed by the electrolyte of the bath. Printing inks of oil and carbon are of such a nature, especially after drying and hardening. Various paints and the like are also suitable. The solvent at the roll cleaning means 19 will be of a nature suited for removal of the dried material used on the drum.

It will be noted that the drum spot-coating and insulating elements are stable and non-soluble for one turn of the drum but are not further retained on the drum. With such a highly polished surface as is provided on the drum, as is needed for forming and stripping a film, and with varied patterns of hole size and location, it is not practical to attempt to provide permanent dot-coating elements on the drum, particularly since there is a strong tendency to pull them off when the perforate sheet is removed. The present arrangement of reprinting and drying an insulating pattern of dot-coating material on the drum and stripping it off and cleaning the drum after each use or turn is especially useful for this purpose. The results and benefits are very different from the practice in the printing art of applying a pattern of soft ink on a drum by a transfer roll, picking up most of the ink on a sheet, and afterward cleaning the printing roll to remove residual soft ink smear from it.

It is thus seen that the present invention provides very simple and economical method and apparatus for forming screen film or sheet. Instead of requiring the multiple steps of first electro-forming a sheet and later etching holes in it, the present invention provides for directly forming a screen sheet with the holes therein in the single electro-deposition step. By varying the rate of rotation of the drum and the rate of electro-deposition the thickness of the resultant screen sheet can readily be varied.

While one embodiment of the invention has been described for purposes of illustration, it is to be understood that there may be various embodiments and modifications within the general scope of the invention.

I claim:

1. The method of making a metal screen sheet, which comprises: offset printing a hole forming pattern of insulating electrolyte-resistant coating material on a highly polished rotary drum surface; drying and hardening the coating material on the drum; electro-depositing sheet-forming metal on the drum as it turns; peeling the formed screen sheet from the drum; cleaning adherent coating material from the screen sheet; cleaning adherent coating material from the drum; and printing a new pattern of coating material on the drum at each turn.

2. The method of making a metal screen sheet, which comprises: offset printing a pattern of insulating hole-forming dots of electrolyte-resistant coating material on a highly polished rotary drum surface; drying and hardening the coating material on the drum; electro-desposititing sheet-forming metal on the drum as it turns; peeling the formed screen sheet from the drum; cleaning adherent coating material from the screen sheet; cleaning adherent coating material from the drum; and printing a new pattern of coating material on the drum at each turn.

3. The method as set forth in claim 1, in whch nickel is electro-deposited on the drum to form a nickel screen sheet.

4. The method as set forth in claim 1, which further includes the making of screen sheet of different thickness by one of the following: (a) changing the rate of drum rotation, (b) varying the rate of electro-deposition.

5. Apparatus for making metal screen sheet, comprising in combination, a drum having a smooth highly polished surface mounted for turning movement as the cathode in a bath having therein an electrolytic solution and anode of a metal to be deposited on the drum, means for offset-printing a pattern of hole-forming dots of adherent electrolyte-resistant material on the drum, means for drying and hardening the material on the drum before it enters the bath, means for electroforming a perforate screen sheet on the drum as it turns, means for peeling the formed sheet from the drum, means for cleaning adherent material from the peeled-off screen sheet, means for cleaning adherent material from the drum, and means for repolishing the drum ready to receive a new printed pattern.

6. Apparatus as set forth in claim 4, wherein said drum is formed of stainless steel and said anode is of nickel.

7. Apparatus for making metal screen sheet, comprising in combination, a drum having a smooth highly polished surface mounted for turning movement as the cathode in a bath having therein an electrolytic solution and anode of a metal to be deposited on the drum, means for offset-printing a hole forming pattern of adherent electrolyte-resistant material on the drum, means for drying and hardening the material on the drum before it enters the bath, means for electroforming a perforate screen sheet on the drum as it turns, means for peeling the formed sheet from the drum, means for cleaning adherent material from the peeled-off screen sheet, means for cleaning adherent material from the drum, and means for repolishing the drum ready to receive a new printed pattern.

References Cited

UNITED STATES PATENTS

| | | | |
|---|---|---|---|
| 2,569,367 | 9/1951 | Bradner et al. | 204—13 |
| 2,805,986 | 9/1957 | Law | 204—11 |
| 2,870,068 | 1/1959 | Schaer | 204—11 |
| 2,884,571 | 4/1959 | Hannahs | 204—12 |

FOREIGN PATENTS

| | | |
|---|---|---|
| 847,614 | 9/1960 | Great Britain. |
| 107,188 | 4/1939 | Australia. |

OTHER REFERENCES

T. R. Bates, Photosensitive Resists for Electroforming Plating, July 1965, pp. 673–676.

JOHN H. MACK, *Primary Examiner.*

T. TUFARIELLO, *Assistant Examiner.*

U.S. Cl. X.R.

204—13, 216